United States Patent [19]

Edwards

[11] Patent Number: 4,457,290
[45] Date of Patent: Jul. 3, 1984

[54] CHARCOAL COOKER

[76] Inventor: Gene R. Edwards, 1321 Michigan Ave., Alma, Mich. 48801

[21] Appl. No.: 6,992

[22] Filed: Jan. 29, 1979

[51] Int. Cl.³ .............................................. F24C 1/16
[52] U.S. Cl. .................................. 126/9 R; 126/25 A; 126/25 R
[58] Field of Search .................. 126/9 R, 25 R, 25 A, 126/29, 30, 245, 38

[56] References Cited

U.S. PATENT DOCUMENTS

| | | | |
|---|---|---|---|
| 2,959,165 | 11/1960 | Mark | 126/9 R |
| 3,394,693 | 7/1968 | Robinson | 126/25 A |
| 3,421,493 | 1/1969 | Miller | 126/9 R |
| 3,490,433 | 1/1970 | Busenbarrick | 126/9 R |
| 3,791,368 | 2/1974 | Hunt | 126/9 R |
| 3,828,759 | 8/1974 | Cooper | 126/9 R |
| 3,999,472 | 12/1976 | Einto | 126/25 R |
| 4,133,335 | 1/1979 | Malafouris | 126/9 R |

FOREIGN PATENT DOCUMENTS 564209 2/1958 Belgium .............................. 126/25 R
WO79/47908 8/1979 PCT Int'l Appl. ................ 126/25 R Primary Examiner—Samuel Scott
Assistant Examiner—G. Anderson
Attorney, Agent, or Firm—Miller, Morriss & Pappas

[57] ABSTRACT

A compact knockdown charcoal cooker which includes an outer pan frame, a nesting fire tray and the outer pan frame forms the base for hinged back and side plates and in support of removable ferrule secured legs. The pan and tray are embossed with radial ribs from a rectangular crossed embossed depression in providing strength at light weight and in resistance to warpage. A grill is adjustably supported above the fire tray on notches in the front edges of the side plates and in corresponding perforations in the back plate. Assembly pins secure sides and back against collapse and all detachable elements are storable in the collapsed knockdown cooker in a rectangular package.

4 Claims, 4 Drawing Figures

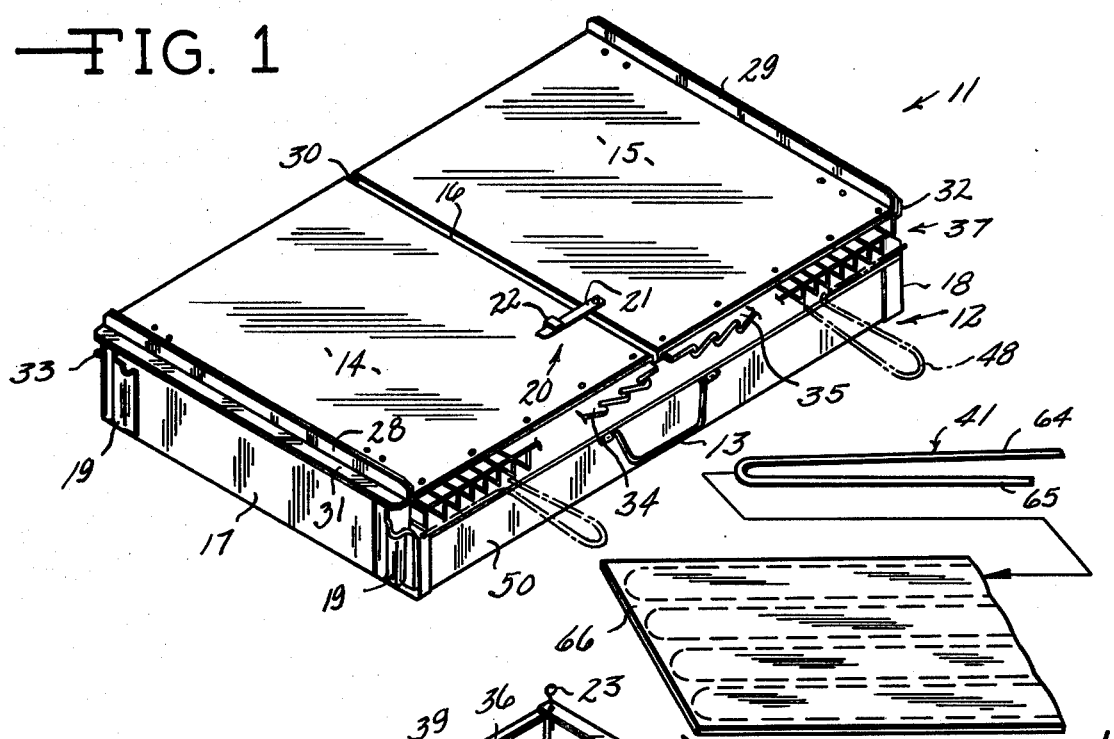
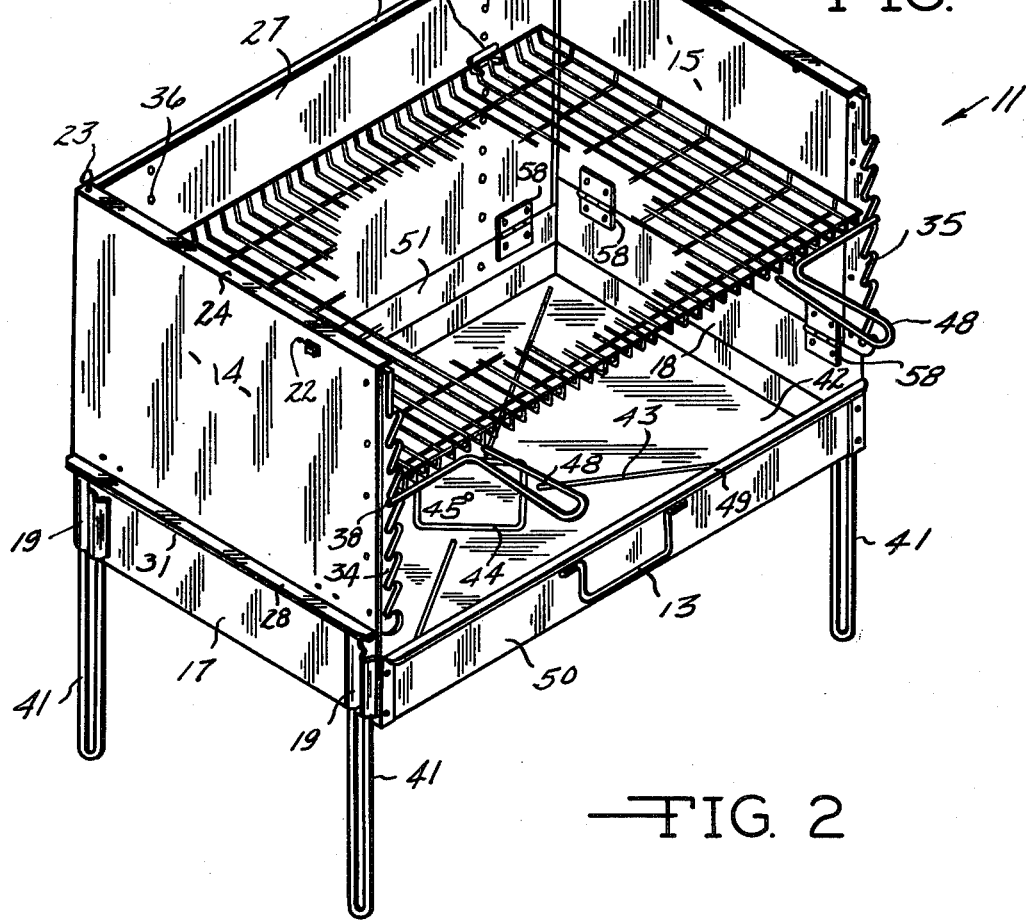

CHARCOAL COOKER

BACKGROUND

The present invention is a highly compact knockdown and lightweight charcoal cooker using relatively light gauge steel deformed to provide strength and to be amenable to inexpensive but durable manufacture.

In general, charcoal cooking stoves or cooking devices are relatively large, cumbersome, and unless placed on wheels or in semi-permanent installations, they are rather unsatisfactory in competition with liquid fuel and gaseous fuel stoves and cookers because of their inconvenience to campers, hikers, boaters, picnickers, and cyclists. Yet, the most satisfactorily grilled and cooked meats and foods are prepared over charcoal.

Many persons have attempted to bring compactness to a charcoal cooker and for the most part charcoal cookers have ended up as cast iron structures which are brittle and impractical for easy transport or have been unusually large and awkward to use or impractical by reason of the combination of substantial heat and sudden cooling which rusts, destroys and warps most metals.

Closest known devices are seen in the United States Letters Pat. Nos. 3,667,446 to Paul S. Morton; 3,610,225 to Merle J. Schwantes; 3,306,281 to William S. Hoebel; 2,477,529 to Leonard M. Sprinkle, et al; and the camp stove 2,122,275 to Dewey H. Bitney. As will be seen, the device of the present invention is distinguishable over the closest references and provides a compact, solid fuel stove unit competitive against liquid and gaseous fuel stove units.

Accordingly, the principle object is to provide a compact, simple and durable charcoal cooker or stove.

Another object is to provide such a structure possessing the best qualities of portability and rigidity with light weight.

Another object is to provide a device which stores all of the necessary elements and which carries an initial charcoal charge.

Still another object is to teach a compact charcoal construction in which the fire tray is easily removed and in which the entire construction is easily cleaned in prevention of rust and corrosion.

Other objects including camper convenience and overall economy with reasonable rigidity will be apparent to those skilled in the art as the description proceeds.

GENERAL DESCRIPTION

In general, the present invention is directed to a compact folding and knockdown charcoal cooker of a type useful in picnics, camping and cook-outs which is easy to assemble and use, which is easy to clean and store, and which is adjustable to meet variant cooking situations. An outer pan is provided which functions as a frame element and an inner lift-out tray nests in the pan frame. All sides of the pan are flanged. The end plates are hinged to the pan in face-to-face relation and the plates have frontal notched edges. The back plate is hinged to the back side of the pan and includes perforations in spaced apart rows. The upper edges of the end plates and back plate are flanged inwardly and at the intersection overlap of the flanges are pins which selectively and removably retain the plates and back in the erected position where they serve as wind screens or baffles. A grill having extensions registering with the perforations in the back plate and with front handles extending laterally to impingement on selected elevations of notches in the face edges of the end plates is provided. Parallel tubular ferrules are secured at the corners of the tray frame and each selectively receives the open end of V-shaped legs deformed to U-shape registry with the ferrules by manual compression and detachable in like manner. The end plates, upon closure, include outer registering latch elements. A handle pivotally secured to the front face of the pan at the center provides a bail-like carrying element and a pair of wire tray-lifters are provided for lift-out of the fire tray. A magnet secured to the back plate provides a non-rattle support for the pins and lifters on closure of the back plate against the fully dropped grill and the legs are easily stored in a fabric sack and rolled up for support in the empty tray. The grill handles may be detachably provided for connection and disconnection from the grills. The pan and fire tray are embossed with radial ribs and a rectilinear center pattern with selected perforations to drain water and juices therefrom and the tolerances of the parts are rather substantial and liberal so that thin gauge metal is useable while providing good support and construction and fabrication economies can be fully realized. No complex tooling or press work is required.

To indicate the compactness of the charcoal cooker of the present invention, while providing pan space for a generous charge of charcoal, the unit is collapsed to a four and one-quarter inch profile, about twenty-three inches long and about fifteen inches wide without the protruding handles. If the handles are fixed to the grill, the width is about four and one-half inches more. The grill handles may be omitted or made for separate use. The importance of these size figures is to indicate the relative proportions and particularly the thin profile. This allows a charcoal cooker to approach the compactness of liquid fuel and gaseous fuel units while assuring the enhanced advantage of charcoal flavor to the food. When opened outwardly by lifting out the hinged side and back plates, the grill can be removed revealing the assembly pins and tray lifters with supported initial charcoal charge in the tray and revealing the legs. The legs are secured in the ferrules on the pan, thus lifting the cooker to a convenient outdoor work height. The grill is located at a convenient height above the fire tray as selected by impingement on selected of the notches and back plate perforations. A spit may be transversely mounted above the grill, as desired. On completion of use the fire tray is lifted free of the pan and dumped to save charcoal or to simply throw away the spent charcoal and ash.

In transport, the cooker unit of the present invention is light in weight, is easily stored and is of rectangular volume which best accommodates packing and storage in most vans, wagons, trucks, automobiles, bike or back packs.

IN THE DRAWINGS

FIG. 1 is a perspective view of the charcoal cooker of the present invention in closed and collapsed carrying condition and indicating the extreme compactness of the unit.

FIG. 2 is an open and assembled perspective view of the charcoal cooker of the present invention ready for cooking and with legs attached.

FIG. 4 is a perspective view of storage pouch and legs and indicating one leg poised for storage.

SPECIFIC DESCRIPTION

Figure 3:
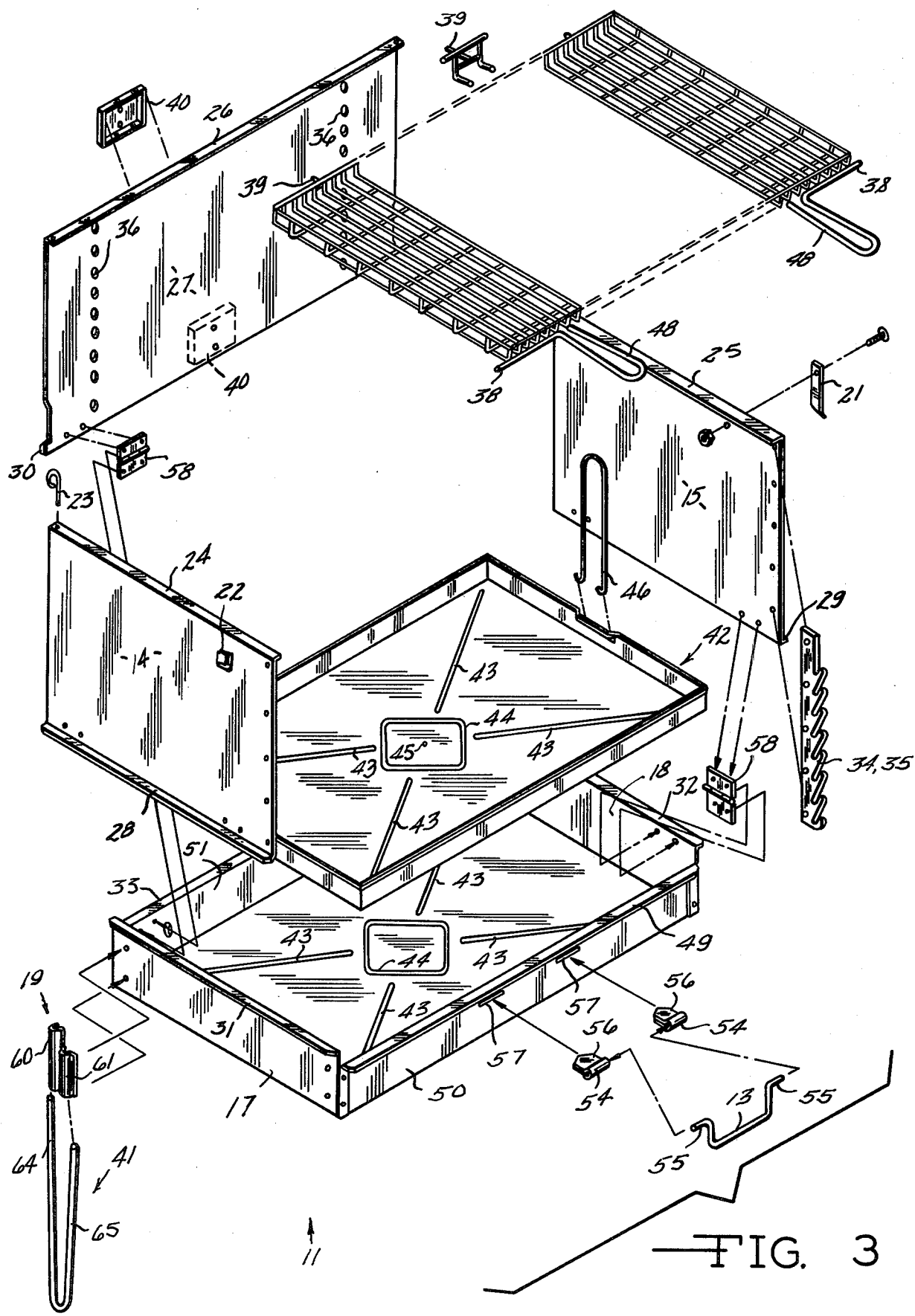
FIG. 3 is an exploded perspective view of the structure of the present invention indicating the simplicity of the parts of the charcoal cooker and their interrelationship for assembly and use.

Referring to the drawings and with first reference to the FIG. 1 thereof, the compact charcoal cooker 11 of the present invention is shown in its fully collapsed and stowed compactness. The size is about that of an attache case and the weight is about eight pounds. The optional griddle handles are indicated in phantom line.

Visible from the exterior of the folded and collapsed charcoal cooker 11 is the pan frame 12. From the front of the pan frame 12 extends the pivotal bail-like handle 13 which provides a convenient carrying means. The end plates 14 and 15 are folded down to the seam 16 at the upper center of the charcoal cooker 11. As will be seen, this is achieved because the end plates 14 and 15 are hinged to the end panels 17 and 18 of the pan frame 12. Front, back and ends, unless otherwise limited herein, have reference to the cooking unit 11 as seen in FIGS. 1 and 2. Visible also in FIG. 1 are two of the four pairs of leg receiving ferrules 19 provided adjacent the corners of the pan frame 12 and welded, riveted or otherwise attached thereto. The closure lock 20 comprising a latch 21 element and a catch 22 element, one on each of the end plates 14 and 15, is visible on the top of the collapsed unit 11.

In FIG. 2 the charcoal cooker 11 is shown fully erected and assembled. Assembly pins 23 are shown passing through the inturned upper flanges 24 and 25 on the upper edges of the end plates 14 and 15, respectively, and through the upper flange 26 on the back plate 27. This prevents the collapse of the plates 14, 15 and 27 and maintains them in a vertical position as shown with the lowermost edge flanges 28, 29 and 30, respectively, in parallel outwardly facing relation against parallel outturned flanges 31, 32 and 33, respectively, in the corresponding sides and back portions 14, 15 and 27 of the pan frame 12. This, as will be seen, allows the location of hinges 33a along the line between the two flanges 28, 29 and 30 and the corresponding flanges 31, 32 and 33 in the pan frame 12. The flanges 31, 32 and 33 serve as stop means limiting any further rotation beyond the desired vertical erected position of the plates 14, 15 and 27. At the front edges of the side plates 14 and 15 are a plurality of aligned notches 34 and 35, respectively. The notches 34-35 are thus in parallel spaced apart registry when vertically positioned, as shown, and are in a plane substantially parallel to the plane of the respective end plates 14 and 15. As will be appreciated, the notches 34 and 35 may be formed integrally with the end plates 14 and 15 or may be prepared from heavier stock and then welded or otherwise fastened to the plates 14 and 15 to form the front edges with notches 34 and 35.

The back plate 27 includes rows of perforations 36 which extend vertically in root register with the notches 34 and 35. The notches 34 and 35 and the perforations 36 provide plural parallel mounting stations for the grill element 37 since laterally extending tabs 38 drop into registering notches 34 and 35 and the rearward extensions 39 protrude through corresponding of the perforations 36. As will be appreciated, the tabs 38 are rigidly affixed to the grill element 37 and may be a part of the grill handles. The location of the grill 37 is selective but contributes, upon location, to the overall rigidity of the erected cooker structure 11 at an elevation depending also on the heat beneath the grill 37.

A magnet 40, fastened to the center of the back plate 27, will be seen to hold the pins 23 and other loose metal parts against rattling while the cooker device 11 is in transit. The legs 41 are shown with the ends forced into parallel relation and into the parallel spaced apart ferrules 19 at or adjacent the corners of the charcoal cooker 11. The legs 41, as will be seen, are V-shaped rod stock. When the divergent portions of the V-shaped rod stock are compressed to approximate parallelity, they are in parallel aligned registry for insertion into the ferrules 19. On release of the legs 41 the rod stock attempts to self-restore and compression locks in the ferrules 19. For removal of the legs 41, the user squeezes the divergent portions to relieve the compression and easily slips the rod stock from ferrules 19. A drain perforated lift tray 42 is nestably in the pan frame 12 and the bottoms of both the lift tray 42 and the pan frame 12 are radially embossed from the center radiating from a central embossed rectangular pattern. The embossed radial grooves 43 are indicated and the central embossing pattern 44 is seen. The grooves 43 extend toward the corners of the pan 12 and tray 42 and form the central rectangular patterns 44 in each. This also rigidifies the cooker 11. The lift tray 42 is really a fire tray 42 since it is in the tray 42 that the included charcoal is burned and can be lifted free to be emptied after use. The drain hole 45 allows water to be poured over the charcoal or for the tray 42 to be washed clean.

In FIG. 3 the actual preferred construction is best revealed in an exploded representation and the tray lifters 46 are seen which hook the edge grip slots 47 in opposite sides of the tray 42. By this means the hot fire tray 42 is seen to be manipulated without burning the user and in storage the wire lifters are held by the magnet 40 against loss. The grill 37 may have integral handles 48 or the lifters 46 are also useable to manipulate the grill 37. In one version (not shown) the handles 48 are selectively detachable from sleeves which surround the outermost tab extensions 38 and which sleeves are welded, brazed or otherwise secured to the grid portion of the grill 37 and so located as to provide rigid lift support for the grill 37. In such a construction, the tab extensions 38 are made a part of the removable handles 48. The magnet 40 is centrally secured as by rivets or other fasteners to the back plate 27. In the FIG. 3 the outturned flanges 31, 32 and 33 of pan frame 12 are most visible and the front flange 49 can best be appreciated. The front panel 50 and the rear panel 51 are lower than the side or end panels 17 and 18 of the pan frame 12. This distance difference in the heights of the side panels 17 and 18 of the pan frame 12 with the front and back panels 50 and 51 allows for the nesting of grill 37, the collapsed back plate 27 and magnet retained lifters 46 and pins 23 over the lift-out fire tray 42. The bail-like carrying wire handle 13 is fastened to the front panel 50 by applying a journal strap 54 over the lateral extensions 55 of the handle 13 and passing the tab ends 56 of the straps 54 into slots 57 provided in the face of the front panel 50. The slots 57 are provided below and adjacent the flange 49 and the tab ends 56 are spread upon assembly and are welded or riveted to the panel 50 on the inside thereof.

Hinges 58 are secured to the inside of plates 14, 15 and 27, as shown, and are also secured on inside of the panels 51, 52 and 53 of the pan frame 12. Hence, the side plates 14 and 15 close inwardly on their hinges 58 over the back plate 27 which moves on its hinges 58 to first closure.

The latch and catch elements 21 and 22 are secured as by welding or other suitable fastening to the outer faces of the end plates 14 and 15 so as to hold the charcoal cooker 11 in closed position. The notch bar 59 is shown carrying the notches 34 and 35 and is made to be secured to the front edges of the end plates 14 and 15 as by welding or other fasteners as rivets or screws.

The ferrules 19 are also best appreciated, each set including parallel grooves 60 and 61 integrally formed from a single piece of metal and having flanged portions 62 and 63 allowing for attachment of the ferrules 19 to the outside of the pan frame 12 adjacent the corners, as shown. When welded onto the pan frame 12, these ferrules 19 receive the legs 41. The legs 41 are generally V-shaped and upon assembly the upturned rod stock ends 64 and 65 are squeezed together into approximate parallelity and inserted in the corresponding openings in the ferrules 19 formed by the corresponding grooves 60 and 61. One groove 60 is slightly longer than the other corresponding to the slightly longer upturned portion 64 of the leg 41.

In FIG. 4 a flat fabric sack 66 is shown which contains V-shaped pockets 67 into which the legs 41 are inserted. This results in an anti-rattle pouch for the legs 41 storable in the fire tray 42. An initial charge of charcoal may also be inserted in the sack 66 with the legs 41 or the charcoal may be placed in the tray 42 around the legs 41 and sack 66.

In constructing the charcoal cooker of the present invention, good quality light gauge sheet metal forms the pan frame 12, the fire tray 42, the end and back plates 14, 15 and 27, the ferrules 19 and the journal straps 54. Their construction, flanging and fastening are by welding or other well known fastening means. The embossing of the pan frame 12 and the fire tray 42 is by using a common die in a suitable light press operation. The grill 37 is made from wire stock shaped as indicated and welded at transverse intersections. The preferred metal is steel. The lifters 46, the assembly pins 23 and the bail-like handle 13 are also made from steel wire stock. The legs 41 are fashioned from heavier metal rod stock of a diameter below the size of the openings provided by the ferrules 19. The magnet 40 may be of the metal or ceramic type and preferably includes an integral cast or formed bracket for simplification of attachment to the back plate 27. By adjusting the elevation of the grill 37 or removal, the cooker 11 becomes a simple roaster by preparing a spit placed across the upper flanges 24 and 25. A journal may also be provided in the plates 14 and 15 to support a manually driven or machine driven spit supported thereby.

The charcoal cooker 11 is compact and is easily stored and made ready for use. It is easily cleaned, is of light weight and allows charcoal to be used without excessive bulk.

Having thus described my invention and the preferred embodiment thereof, others skilled in the art will readily perceive improvements, changes and modifications within the skill of the art and such improvements, changes and modifications are intended to be included herein limited only by the scope of my hereinafter appended claims.

I claim:

1. A thin profile compact foldable rectangular knockdown charcoal cooker comprising:
    an embossed bottom sharp corner pan frame having vertical ends, a vertical back and front, and said ends back and front having horizontally disposed flanges, pairs of tubular ferrules secured to said frame adjacent the corners thereof, and a carrying handle pivotally secured to said front of said pan frame;
    an embossed bottom sharp corner fire tray nestable in said pan frame and removable therefrom;
    a perforated back plate having a top flange and a bottom flange and hinged to the back of said pan frame;
    a pair of spaced apart end plates having notched front edges in elevational registry with said perforations in said back plate and having flanged upper and lower edges and hinged to said pan frame, said upper flanges having an opening therethrough in registering overlap to similar openings in said upper flanges of said back plate;
    assembly pins selectively and removably positioned in said registering openings in said flanges;
    V-shaped legs resiliently deformable to parallel registry at the ends thereof, and each of said legs selectively and removably positioned in said pairs of ferrules in said frame; and
    a grill selectively supported in perforations in said back plate and in corresponding of said notches in said front edges of said end plates.

2. In the combination of claim 1 wherein said grill is nestable in said fire tray, said back plate is pivotal downward onto said grill and said end plates hinge pivotally to closure on top of said back plate, and said assembly pins and said legs are stored in said tray and said pan frame as closed by said plates.

3. In the combination of claim 2 wherein said closure includes a latch element on one of said end plates and a lock element on said other of said end plates.

4. In the combination of claim 1 wherein the embossed bottoms of said pan and said tray include a central rectilinear closed groove pattern having rounded corners and with radial grooves running outwardly from said central pattern and toward the corners of said pan and said tray and said bottom of said tray having a central drain defined therethrough.

* * * * *